US012552537B2

(12) United States Patent
Escobar et al.

(10) Patent No.: US 12,552,537 B2
(45) Date of Patent: Feb. 17, 2026

(54) PASSENGER SEAT FOLDING PRIVACY SHIELD

(71) Applicant: Safran Seats USA LLC, Gainesville, TX (US)

(72) Inventors: Kristyan Khalil Escobar, Chihuahua (MX); Teresa del Carmen Antillon Licon, Chihuahua (MX)

(73) Assignee: Safran Seats USA LLC, Gainesville, TX (US)

( * ) Notice: Subject to any disclaimer, the term of this patent is extended or adjusted under 35 U.S.C. 154(b) by 22 days.

(21) Appl. No.: 18/023,789

(22) PCT Filed: Aug. 31, 2020

(86) PCT No.: PCT/US2020/048702
§ 371 (c)(1),
(2) Date: Feb. 28, 2023

(87) PCT Pub. No.: WO2022/046095
PCT Pub. Date: Mar. 3, 2022

(65) Prior Publication Data
US 2023/0312095 A1    Oct. 5, 2023

(51) Int. Cl.
*B64D 11/06*    (2006.01)
(52) U.S. Cl.
CPC ............... *B64D 11/0606* (2014.12)
(58) Field of Classification Search
CPC ...... B64D 11/0606; B60N 2/885; B60N 2/99; B60N 2/986; B60N 2/91; A47C 7/666
See application file for complete search history.

(56) References Cited

U.S. PATENT DOCUMENTS

| | | | | |
|---|---|---|---|---|
| 6,644,736 | B2 * | 11/2003 | Nguyen | B64D 11/0606 |
| | | | | 297/184.17 |
| 7,980,617 | B2 * | 7/2011 | Brncick | B60N 2/99 |
| | | | | 296/64 |
| 8,985,622 | B1 * | 3/2015 | Cannon | B60R 21/231 |
| | | | | 280/730.2 |
| 9,586,686 | B2 * | 3/2017 | Asli | B64D 11/06 |

(Continued)

FOREIGN PATENT DOCUMENTS

| | | | | |
|---|---|---|---|---|
| DE | 102008052841 A1 * | 5/2010 | | B64D 11/06 |
| DE | 102015114382 A1 * | 3/2017 | | |

(Continued)

OTHER PUBLICATIONS

International Patent Application No. PCT/US2020/048702, International Search Report and Written Opinion, dated Apr. 23, 2021.

*Primary Examiner* — Philip J Bonzell
(74) *Attorney, Agent, or Firm* — Kilpatrick Townsend & Stockton LLP

(57) ABSTRACT

A passenger seat folding privacy shield can include a partition pivotable about a pivot edge or otherwise adjustable between a deployed position and a stowed position. In the deployed position, the privacy shield can extend forward from a lateral edge of the seat back so as to form at least a partial barrier between a living space of the passenger seat and an adjacent seat. In the stowed position, the partition may be arranged overlying a cushioning portion of the seat back or situated laterally outward from a perimeter of the seat back.

17 Claims, 3 Drawing Sheets

(56) References Cited

U.S. PATENT DOCUMENTS

| | | | |
|---|---|---|---|
| 10,479,506 B1* | 11/2019 | Colletti | B60N 2/90 |
| 10,683,591 B1* | 6/2020 | Podhajny | D03D 11/02 |
| 10,843,608 B2* | 11/2020 | Carlson | B60N 2/885 |
| 11,077,780 B2* | 8/2021 | Akaike | B60N 2/879 |
| 11,591,090 B2* | 2/2023 | Bonnefoy | B64D 11/0606 |
| 11,691,737 B2* | 7/2023 | Miles | B64D 11/0647 |
| | | | 297/112 |
| 11,851,186 B2* | 12/2023 | Bonnefoy | B60N 2/005 |
| D1,014,104 S* | 2/2024 | Escobar | D6/716.5 |
| 2003/0146654 A1* | 8/2003 | Nguyen | B64D 11/0606 |
| | | | 297/232 |
| 2006/0043777 A1* | 3/2006 | Friedman | B60R 21/02 |
| | | | 297/216.13 |
| 2008/0111406 A1* | 5/2008 | Friedman | B60N 2/42727 |
| | | | 297/464 |
| 2011/0012386 A1 | 1/2011 | Brncick et al. | |
| 2014/0117731 A1* | 5/2014 | Asli | B64D 11/0647 |
| | | | 297/284.9 |
| 2016/0082866 A1 | 3/2016 | Kronenberger | |
| 2019/0329891 A1* | 10/2019 | Bonnefoy | B60N 2/005 |
| 2019/0359338 A1* | 11/2019 | Colletti | B64D 11/0606 |
| 2021/0339869 A1* | 11/2021 | Miles | B64D 11/0642 |
| 2023/0174236 A1* | 6/2023 | Bonnefoy | B60N 2/005 |
| | | | 244/118.6 |

FOREIGN PATENT DOCUMENTS

| | | | | |
|---|---|---|---|---|
| JP | 2016159866 A | | 9/2016 | |
| WO | WO-2011089580 A2 * | | 7/2011 | B60N 2/449 |
| WO | 2020104798 A1 | | 5/2020 | |

* cited by examiner

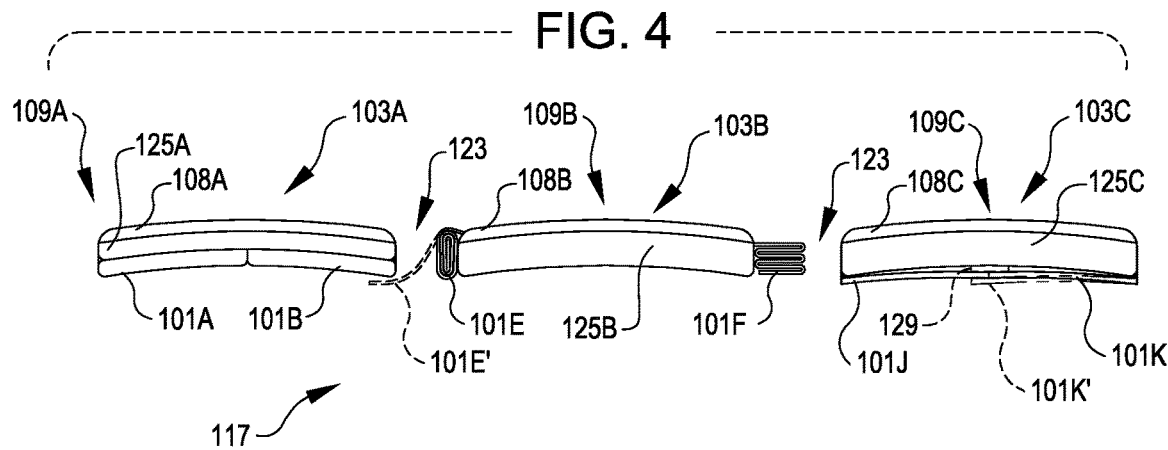
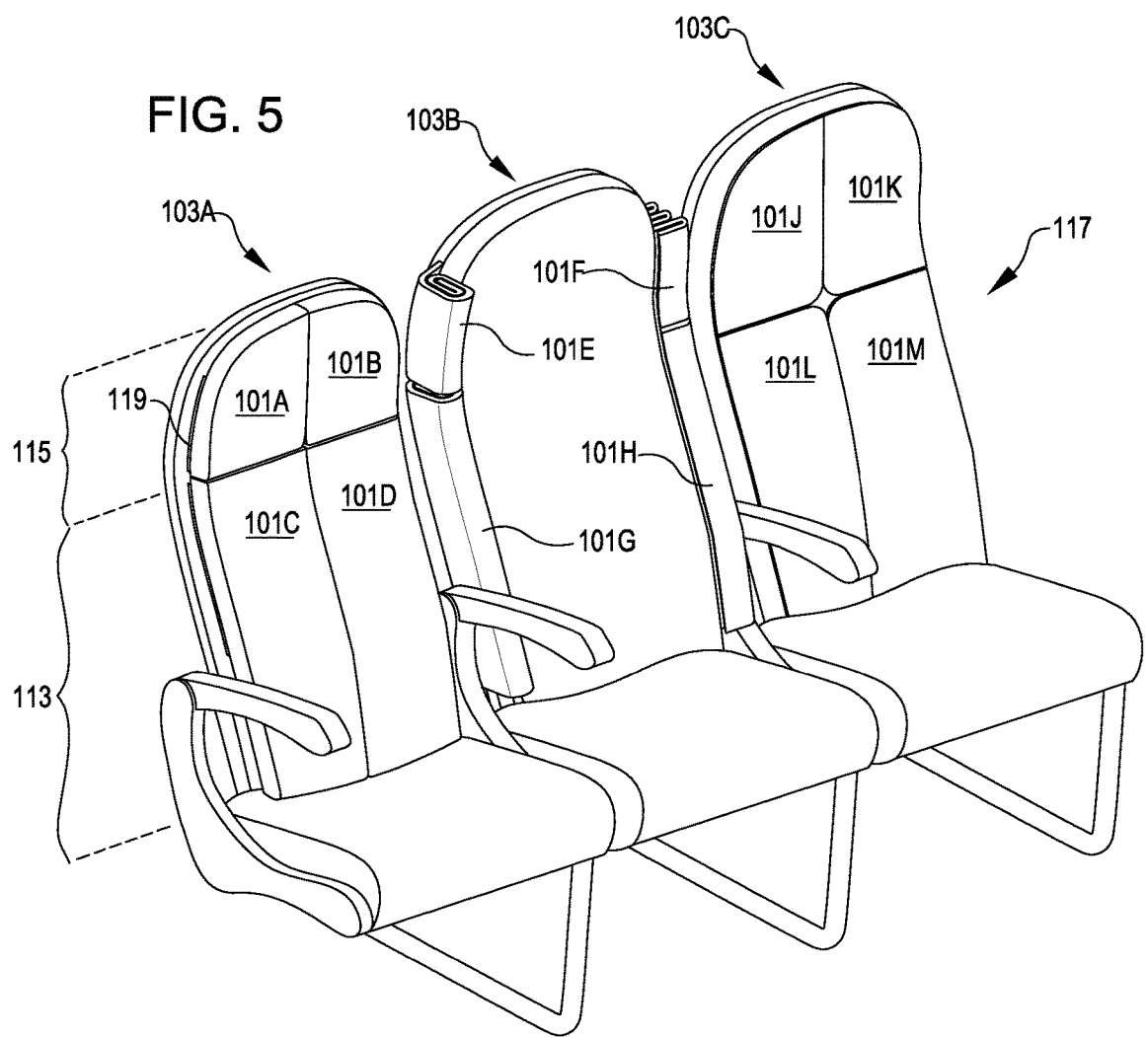

PASSENGER SEAT FOLDING PRIVACY SHIELD

FIELD OF THE INVENTION

The field of the invention relates to privacy features for seats of passenger vehicles such as aircrafts.

BACKGROUND

Passenger comfort can be an important consideration in carrier industries, particularly with air carriers. To this end, most seats in commercial passenger aircraft include features such as armrests and headrests to support different parts of a passenger's body when seated. Generally, armrests provide a physical structure that delineates a boundary between where the living space of one passenger seat ends and where that of another begins. Yet, the separation between living spaces of adjacent seats is sometimes nebulous or imprecise, such as in situations in which adjacent seat backs are separated merely by a single armrest that may be utilized by either one or both of passengers seated on opposite sides of the armrest. As a result, many existing passenger seat arrangements may cause passengers to uncomfortably feel a lack of privacy or clear boundaries relative to living spaces of adjacent seats.

SUMMARY

The terms "invention," "the invention," "this invention" and "the present invention" used in this patent are intended to refer broadly to all of the subject matter of this patent and the patent claims below. Statements containing these terms should be understood not to limit the subject matter described herein or to limit the meaning or scope of the patent claims below. Embodiments of the invention covered by this patent are defined by the claims below, not this summary. This summary is a high-level overview of various aspects of the invention and introduces some of the concepts that are further described in the Detailed Description section below. This summary is not intended to identify key or essential features of the claimed subject matter, nor is it intended to be used in isolation to determine the scope of the claimed subject matter. The subject matter should be understood by reference to appropriate portions of the entire specification of this patent, any or all drawings and each claim.

According to certain embodiments of the present invention, provided may be a method of enhancing privacy for a passenger of a passenger seat. The method can include deploying a shield relative to an axis along a lateral edge of the passenger seat from a stowed position in which the shield is arranged overlying a cushioning portion of a seat back of the seat or situated laterally outward from a perimeter of the seat back. The method can also include positioning the shield to extend forward from the lateral edge of the seat back so as to form at least a partial barrier between a living space of the passenger seat and an adjacent seat.

In some embodiments, the shield includes a first shield deployable from a first lateral side of the seat back. The method can also include deploying a second shield from a second lateral side of the seat back.

In some embodiments, the shield may include an upper shield deployable from an upper portion of the seat back. The method may also include deploying a lower shield from a lower portion of the seat back.

In some embodiments, the shield may include an upper left shield deployable from an upper portion of a left side of the seat back. The method may also include deploying an upper right shield from an upper portion of a right side of the seat back, deploying a lower left shield from a lower portion of the left side of the seat back, and deploying a lower right shield from a lower portion of the right side of the seat back.

In some embodiments, the method includes swinging the shield laterally about the axis along the lateral edge of the passenger seat.

According to certain embodiments of the present invention, provided may be a passenger seat that includes a seat pan, a seat back, and a privacy shield. The privacy shield may be adjustable between: a stowed position in which the privacy shield is arranged overlying a cushioning portion of the seat back or situated laterally outward from a perimeter of the seat back, and a deployed position extending forward from a lateral edge of the seat back so as to form at least a partial barrier between a living space of the passenger seat and an adjacent seat.

In some embodiments, the cushioning portion of the seat back remains fixed within the perimeter of the seat back in the stowed position of the privacy shield, in the deployed position of the privacy shield, and in transition between the stowed position and the deployed position of the privacy shield.

In some embodiments, the privacy shield is releasably mounted to the seat back. The privacy shield may be stowable against the seat back. The cushioning portion of the seat back may be sandwiched between a rear portion of the seat back and a cushioning material in the privacy shield in the stowed position.

In some embodiments, the privacy shield may include one or more layers sized to cover a portion of a front surface of the seat back in the stowed position, where the one or more layers have a combined thinness through which the cushioning portion of the seat back support a passenger when seated in the seat.

In some embodiments, the privacy shield is stowable in an arrangement extending laterally to overlay a portion of the adjacent seat.

In some embodiments, the privacy shield may include a first privacy shield, and the passenger seat may further include a second privacy shield coupled along an opposite lateral edge of the seat back and pivotable to position a free end of the second privacy shield to overlap the first privacy shield in the stowed position.

According to certain embodiments of the present invention, provided may be a passenger seat privacy shield that includes a partition sized to extend in a deployed position forward from a lateral edge of a seat back of a passenger seat so as to form at least a partial barrier between a living space of the passenger seat and an adjacent seat. The passenger seat privacy shield can also include a pivot edge along which the partition is pivotable between the deployed position and a stowed position in which the partition is arranged overlying a cushioning portion of the seat back of the seat or situated laterally outward from a perimeter of the seat back.

In some embodiments, the passenger seat privacy shield is at least one of foldable relative to a torso portion of the seat back or foldable relative to a headrest portion of the seat back. The pivot edge may include a hinge. The hinge may include a fabric juncture. The fabric juncture may include a knitted structure. The partition may include cushioning material.

In some embodiments, the partition includes a collapsible partition collapsible along at least one axis to fit within a space between the lateral edge of the seat back of the passenger seat and the adjacent seat.

BRIEF DESCRIPTION OF THE DRAWINGS

FIG. 4 is a top view of the row of passenger seats of FIGS. 2-3 and shows examples of stowed states according to various embodiments.

FIG. 5 is a perspective view of the row of seats of FIGS. 2-4 and again shows stowed states according to various embodiments.

DETAILED DESCRIPTION

Figure 1:
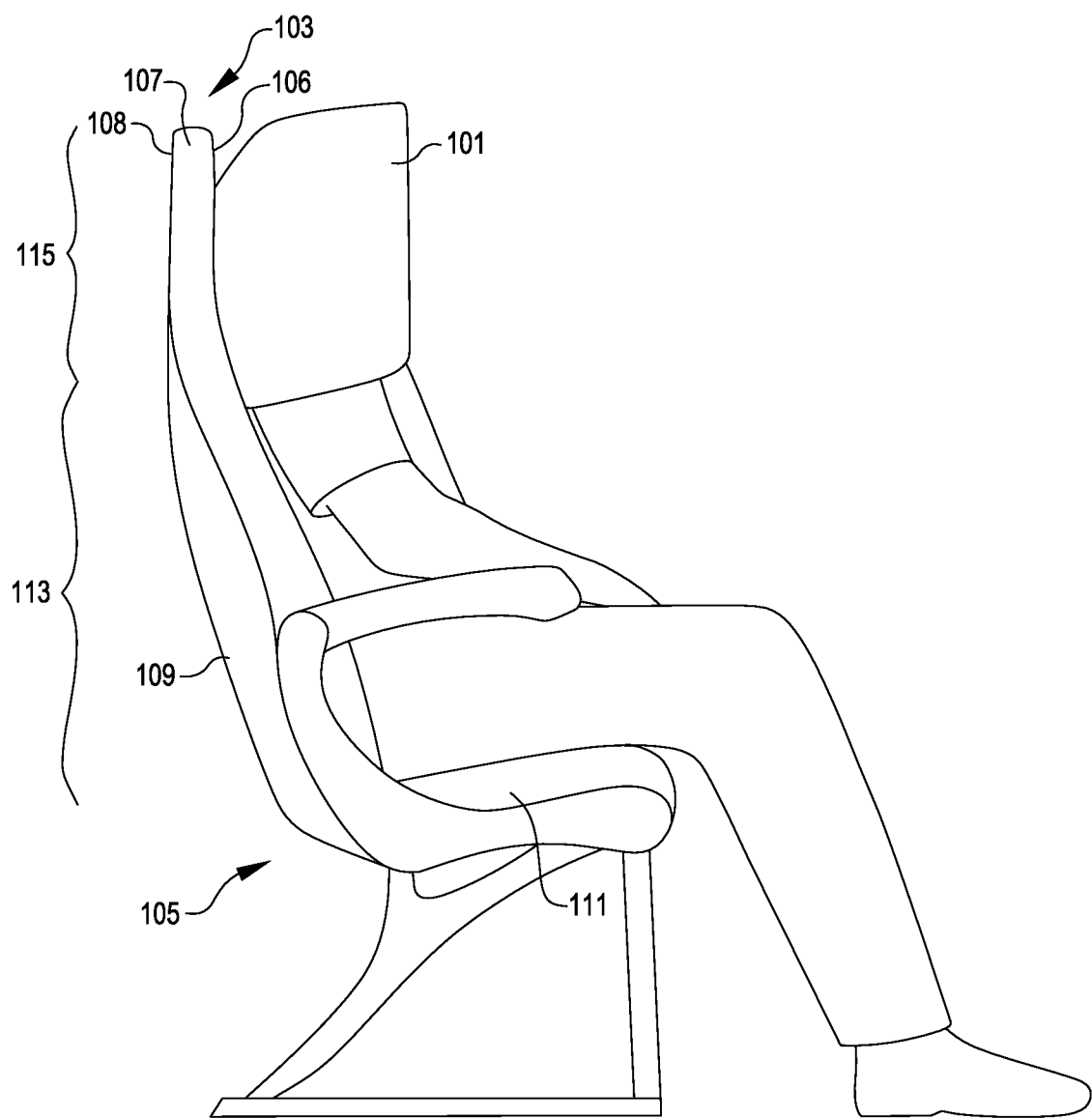
FIG. 1 is a side view of a passenger seat equipped with a privacy shield, according to various embodiments.

The subject matter of embodiments of the present invention is described here with specificity to meet statutory requirements, but this description is not necessarily intended to limit the scope of the claims. The claimed subject matter may be embodied in other ways, may include different elements or steps, and may be used in conjunction with other existing or future technologies. This description should not be interpreted as implying any particular order or arrangement among or between various steps or elements except when the order of individual steps or arrangement of elements is explicitly described.

The described embodiments provide privacy shields for passenger seats. While the privacy shields are discussed for use with aircraft seats, they are by no means so limited. Rather, embodiments of the privacy shields may be used in passenger seats or other seats of any type or otherwise as desired. For example, embodiments may be used on trains, buses, movie theaters, student seating, or any other instance when privacy between adjacent seats may be useful.

In various embodiments, the privacy shield can correspond to a structure that can be deployed from a lateral edge of a seat back to provide a barrier between a passenger in the seat and another passenger in an adjacent seat. When deployed, the privacy shield can extend forward of the seat back, for example, to a position in which a seated passenger has any view blocked of a neighboring passenger's face. The privacy shield may extend any suitable distance vertically, for example, with one or more segments adjacent a passenger's head and/or torso.

Positioning the privacy shield to extend forward of the seat back may increase the seated passenger's sense of privacy and/or more fully delineate the passenger's living space in comparison to a boundary marked by the armrest alone. Additionally or alternatively, the deployed privacy shield may increase the seated passenger's sense of security, since the privacy shield may also serve to inhibit the propagation of pathogens by working as a physical barrier in situations when social distancing or physical distancing is not practicable. For example, the passenger may appreciate the privacy shield as an extra protection above and beyond robust air purification systems and/or other systems that may already be in place aboard aircraft to help make travel safe.

The privacy shield may also be stowed, for example, when adjacent seats are unoccupied, when adjacent seats are occupied by others in the passenger's family, and/or in other situations in which the privacy shield is not desired. The privacy shield may be stowed in an unobtrusive location or position. In some examples, a stowed privacy shield may extend along or overlap a front face of the seat, e.g., forming a portion of the cushioning of the seat back or seat pan or forming a thin cover that overlays the cushioning of the seat back or seat pan. In some examples, a stowed privacy shield may fit within a space between adjacent seat backs and/or seat pans. In some examples, a stowed privacy shield may lay flat or otherwise extend along a front of an adjacent seat, such as in situations where seats are intentionally left empty to increase spacing among passengers and comply with protocols relating to travel during pandemic conditions.

According to certain embodiments of the present invention, as shown in FIGS. 1-5, a privacy shield 101 can be implemented relative to a passenger seat 103 that includes a seat body 105.

The seat body 105 can have a front 106 and a rear 108. The seat body 105 can further have a lateral side 107, which may be defined between, be spanning between, and/or connect the front 106 and the rear 108.

The seat body 105 can include a seat back 109 and a seat pan 111. The seat back 109 and the seat pan 111 may be fixed relative to one another or movable to one another, e.g., to facilitate suitable recline motion if the seat 103 is reclinable. In some examples, the seat back 109 and the seat pan 111 may be a single load-bearing structure. The lateral side 107 may form at least a portion of a perimeter of the seat back 109, the seat pan 111, and/or other portion of seat body 105.

Respective elements of the seat body 105 may include suitable materials and/or features to facilitate various functions. For example, in various embodiments, the seat pan 111 and the front 106 of the seat back 109 include non-rigid or pliable materials (e.g., fabric, textiles, foam, or other cushioning material) for the comfort of passengers when supported in the passenger seat 103. Other more rigid materials may also be included, such as to reinforce pliable materials, or to provide components for other functions. For example, the seat back 109 on the rear 108 may include a shroud that is formed from rigid material and that is coupled with cushioning material of the seat back 109. Suitable examples of rigid material that may be used for the shroud and/or other components described herein include, but are not limited to, aluminum, stainless steel, aramid fibers, polycarbonate, polypropylene, other metallic materials, composite materials, or other similar materials.

The seat back 109 and/or seat pan 111 can include suitable contouring or other features for facilitating passenger comfort. The seat body 105 may include different portions sized and arranged to support and/or receive different parts of a passenger. For example, the seat back 109 can include a torso portion 113 and a headrest portion 115 (e.g., along which a torso and head of a passenger are respectively positioned when the passenger is seated).

The privacy shield 101 can include or correspond to a partition (e.g., a panel) that is moveable between deployed and stowed positions. In the deployed position, the partition of the privacy shield 101 can extend forward from the front 106 of seat back 109 or other portion of the passenger seat 103. Such arrangement can allow the privacy shield 101 to form at least a partial barrier between a living space of the passenger seat 103 and an adjacent seat. The privacy shield 101 being adjustable between a stowed and deployed position, for example, may allow a passenger to choose whether or not to utilize or implement the privacy shield 101. Any suitable structure can be utilized to facilitate such functionality, and some examples are described herein in greater detail with respect to FIGS. 2-5.

Figure 2:
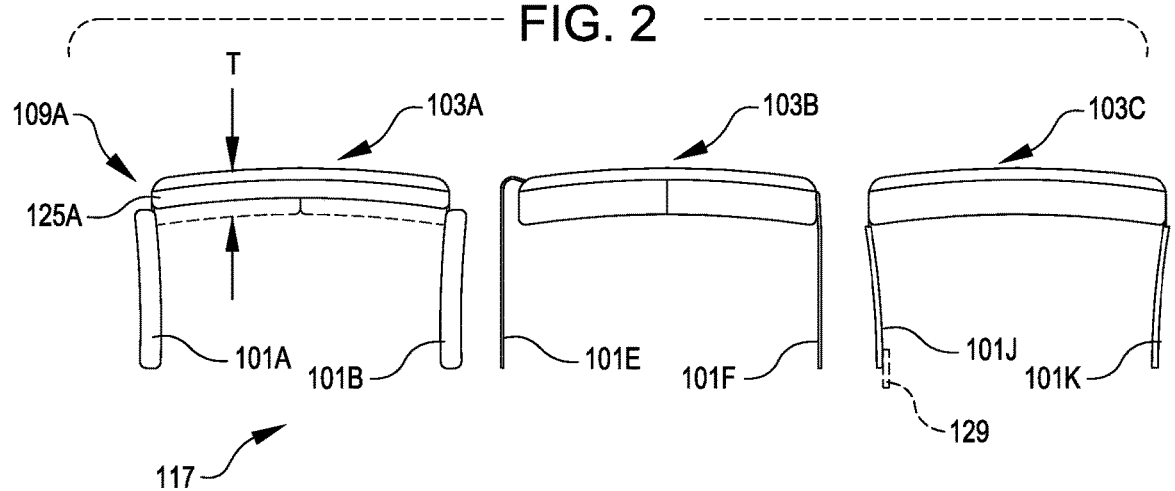
FIG. 2 is a top view of a row of passenger seats in which examples of the privacy shield have been implemented and shows the privacy shields in deployed states according to various embodiments.
Figure 3:
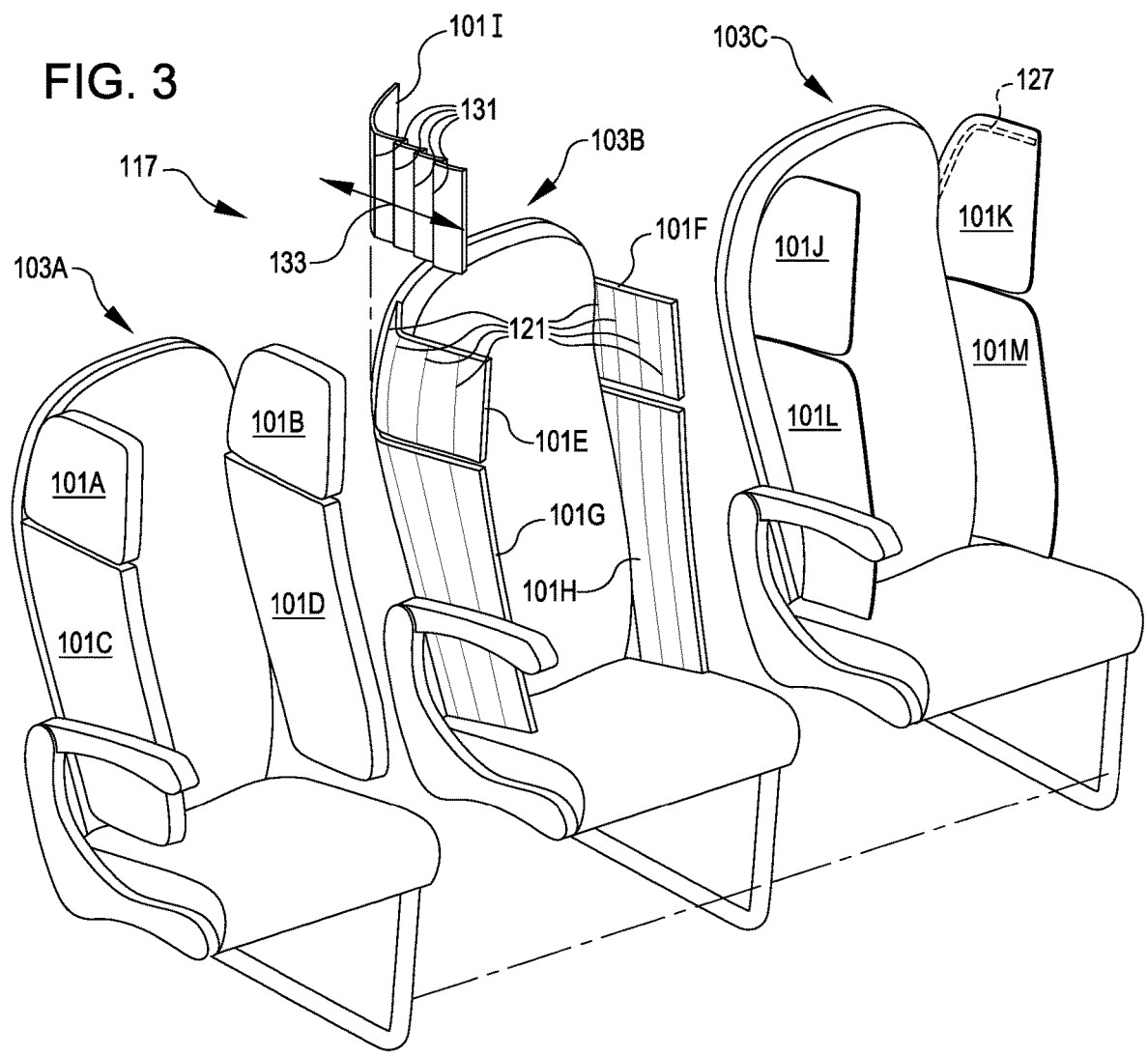
FIG. 3 is a perspective view of the row of seats of FIG. 2 and again shows deployed states according to various embodiments.

FIGS. 2 and 3 are respectively top and perspective views illustrating a row 117 in which various examples of the passenger seat 103 and associated privacy shields 101 can be implemented. For clarity herein, reference numbers with suffixes may be used to indicate specific examples, while reference numbers without suffixes may be used to discuss respective elements generally and/or collectively. For example, the row 117 is shown in FIGS. 2 and 3 with three particular examples of passenger seats 103A, 103B, and 103C and various privacy shields 101A through 101M, although any other combination and/or number of one or more passenger seats 103 and/or privacy shields 101 may be utilized. As an illustrative example, although each of the depicted passenger seats 103A, 103B, and 103C is shown in FIG. 3 with four connected privacy shields 101, arrangements are not so limited and can include a passenger seat 103 having one, two, three, four, or more than four privacy shields 101.

FIGS. 2 and 3 show examples of deployed positions of the privacy shields 101. Generally, in the deployed position, the partition of the privacy shield 101 can extend forward from a lateral edge of the seat back 109. As used herein, the lateral edge of the seat back 109 may include some portion of the lateral side 107 of the seat back 109 and/or a marginal portion on the front 106 of the seat back 109 (such as within two inches of the lateral side 107 of the seat back 109).

FIGS. 4 and 5 are respectively top and perspective views illustrating examples of stowed positions of the privacy shields 101 of the row 117 shown in FIGS. 2 and 3. Generally, when in a stowed position, the partition of the privacy shield 101 may be arranged against or overlying the seat back 109 (e.g., such as may be seen in FIG. 5 with privacy shields 101A through 101D and 101J through 101M) or situated laterally outward from the perimeter of the seat back 109 (e.g., such as may be seen in FIG. 5 with privacy shields 101E through 101H).

The privacy shield 101 can include or be coupled with any suitable structure to facilitate movement or adjustment between stowed and deployed positions (e.g., from the positions in FIGS. 4 and 5 to the positions in FIGS. 2 and 3 or vice versa). In some examples, the privacy shield 101 includes or is coupled with a mount or pivot edge 119 (e.g., as shown by way of example with passenger seat 103A in FIG. 5). The privacy shield 101 may be pivotable along the pivot edge 119 between deployed and stowed states, for example. The pivot edge 119 can include a hinge or other structure to facilitate folding or pivoting. Non-limiting examples may include strap hinges, pivot hinges, piano hinges, knife hinges, concealed hinges, butt hinges, barrel hinges, butterfly hinges, flag hinges, torque hinges, living hinges, or a fabric juncture. In some examples, the fabric juncture may include or be included in a knitted structure. For example, an outer cover of the seat 103 may be at least partially knitted and at least partially encase a portion of the privacy shield 101 in a manner that permits folding, pivoting, and/or other forms of collapsing and/or expansion. Such fabrication may reduce weight and/or numbers of parts.

The partition of the privacy shield 101 may be foldable or otherwise collapsible along at least one axis 121 (such as axes 121 denoted by way of example in FIG. 3 for privacy shields 101E and 101F). In various examples, collapsing along one or more axes 121 may allow a respective privacy shield 101 to fit within a space 123 (e.g., FIG. 4) between lateral sides 107 (e.g., FIG. 1) of adjacent passenger seats 103. As an illustrative example, axes 121 (e.g., FIG. 3) may allow coiling or spiraling (such as shown by privacy shield 101E in FIGS. 4-5 with overlapping turns), an accordion-like compression (such as shown by privacy shield 101F in FIGS. 4-5 with stacked layers), or any other suitable compressive collapsing or extending expansion. In addition, although the privacy shields 101E and 101F in FIG. 4 are depicted as occupying approximately half or less than half of the space 123 between adjacent passenger seats 103 (e.g., which may facilitate fitting of another privacy shield 101 from an adjacent seat 103 in the space 123), the privacy shields 101 may utilize any fraction of the space 123. For example, in a space 123 of 5 cm between adjacent seats 103, the privacy shield 101 may occupy 2 cm, 2.5 cm, 3 cm, 4 cm, or any other amount of space equal to or less than 5 cm (or other total size of the space 123).

Furthermore, the privacy shields 101 are not limited to the number of axes 121 depicted for passenger seat 103B but may utilize any arrangement of at least one axis 121 to facilitate suitable folding, unfolding, collapsing, and/or expansion to move between stowed and deployed states. For example, in some examples, the pivot edge 119 (e.g., FIG. 5) may define one or more of the axes 121 (e.g., FIG. 3) for folding and/or collapsing the privacy shield 101. Thus, for example, deploying the privacy shield 101 may involve swinging the privacy shield 101 laterally about an axis 121 along the lateral edge of the passenger seat 130.

Any suitable material or combination of materials can be used to construct the privacy shield 101. For example, sufficiently flexible, non-rigid, and/or pliable material may be utilized to permit flexing or movement along or about the axes 121 (FIG. 3) or suitable junctures or interfaces between rigid or non-rigid materials may be used to enable flexing or movement along or about the axes 121. In some examples, the privacy shield 101 may include material that is subject to an anti-microbial surface treatment or that otherwise exhibits anti-microbial properties. As a non-limiting example, copper wires or mesh may be included in or on fabric and enhance anti-microbial properties.

In some examples, the partition of the privacy shield 101 can contribute to an amount of cushioning provided by the passenger seat 103. For example, as may best be seen with reference to passenger seat 103A in FIG. 4, cushioning material of the same or different varieties may be included in a cushioning portion 125A of the seat back 109A and in the privacy shield 101A. Thus, in the stowed position, the cushioning portion 125A of the seat back 109A can be sandwiched between the rear 108A of the seat back 109A and a cushioning material in the privacy shield 101A (e.g., such that a passenger when supported by the seat 103A with the privacy shield 101A stowed will be supported at least by the combined stack of the cushioning material the privacy shield 101A and in the cushioning portion 125A of the seat back 109A, either or both of which may in turn be supported by a frame element that is at least partly included in or coupled with the rear 108A of the seat back 109A). In the deployed position (e.g., FIG. 2), the privacy shield 101A may be positioned swung laterally outward, for example, which may allow the passenger to be supported by cushioning material in the cushioning portion 125A of the seat back 109A without also being supported by the cushioning material in the privacy shield 101A (e.g., with the passenger's shoulders at least partially located in the space vacated by the privacy shield 101A and indicated in dashed line for the passenger seat 103A in FIG. 2).

The privacy shield 101A may be sized so that an overall thickness T of the passenger seat 103 when the privacy shield 101A is stowed is approximately equivalent to a thickness of a seat of the same model provided without a privacy shield 101. The privacy shield 101A may occupy ¼, ⅓, ½, or some other fraction of the overall thickness T of the passenger seat 103A, for example. As an illustrative example, in a passenger seat 103A having a total thickness T of 10 cm thick, the privacy shield 101A may account for 2.5 cm (i.e., ¼ of the total) when stowed. More generally, passenger seats 103 may include privacy shields 101 without appreciably altering an overall thickness T of an associated seat back 109 from a standard sizing, although privacy shields 101 can also be implemented to increase or decrease from a standardized overall thickness T.

In some examples, the partition of the privacy shield 101 may avoid impeding the amount of cushioning provided by the passenger seat 103. As illustrative examples with reference to FIG. 4, the privacy shields 101E and 101F being located laterally outward of the perimeter of the passenger seat 103 in stowed positions may retain the cushioning portion 125B of the seatback 109B as accessible to the passenger. As further illustrative examples with reference to FIG. 4, the privacy shields 101J and 101K may be constructed of one or more layers that are sized to cover at least part of the front 106 in the stowed position and that have a combined thinness through which the cushioning portion 125C of the seat back 109C support a passenger when seated in the passenger seat 103C. As an example, the combined thinness in the privacy shield 101E may be less than 5 mm (e.g., an order of magnitude smaller for a seat back 109C that is between 5 cm and 10 cm thick), although other dimensions and/or relative sizes may be utilized. Stability may be provided by any suitable construction, such as in arrangements in which the one or more layers are formed of fabric, membranes, or other flexible material and may be reinforced with wire 127 (e.g., as best seen in FIG. 3) or other suitably rigid infrastructure to allow the privacy shield 101K to maintain a shape when moved between stowed and deployed positions. In some examples, the one or more layers may retain a shape based on a resiliency of a material of which the one or more layers are formed.

Generally, the privacy shield 101 may be operable independent of the cushioning portion 125 of the seat back 109 (e.g., cushioning portions 125A, 125B, and 125C of seat backs 109A, 109B, and 109C). The cushioning portion 125 of the seat back 109 may remain fixed within the perimeter of the seat back 109 in the stowed position of the privacy shield 101 (e.g., FIGS. 4 and 5), in the deployed position of the privacy shield 101 (e.g., FIGS. 2 and 3), and in transition between the stowed position and the deployed position of the privacy shield 101.

Any arrangement or combination of privacy shields 101 can be utilized. In various examples, privacy shields 101 may be deployed independently of one another, for example, such that a passenger may have the choice of which (if any) privacy shields to utilize. In some examples, a first privacy shield 101 is deployable from a first lateral side (such as the left or the right) of the seat back 109 and a second privacy shield 101 is deployable from a second lateral side (such as the opposite side or the other of the left or the right) of the seat back 109. As illustrative examples in FIG. 5, privacy shields 101A, 101C, 101E, 101G, 101J, 101L are depicted as deployable from the left side in the view, while privacy shields 101B, 101D, 101F, 101H, 101K and 101M are depicted as deployable from the right side in the view.

In some examples, an upper privacy shield 101 is deployable from an upper portion of the seat back 109 and a lower privacy shield 101 is deployable from a lower portion of the seat back 109. As illustrative examples in FIG. 5, privacy shields 101A, 101B, 101E, 101F, 101J, and 101K are depicted as deployable from an upper portion in the view, while privacy shields 101C, 101D, 101G, 101H, 101L and 101M are depicted as deployable from a lower portion in the view.

In some examples, privacy shields 101 may be deployable from or relative to different portions of the passenger seat 103, such as from or relative to the torso portion 113 or the headrest portion 115. As illustrative examples in FIG. 5, privacy shields 101C, 101D, 101G, 101H, 101L and 101M are depicted as deployable from the torso portion 113 in the view, while privacy shields 101A, 101B, 101E, 101F, 101J, and 101K are depicted as deployable from an the headrest portion 115 in the view.

In some examples, privacy shields 101 may be included in groups of four or more for a given passenger seat 103. As an illustrative example in FIG. 5, passenger seat 103A is depicted with an upper left privacy shield 101A deployable from an upper portion of a left side of the seat back 109A, an upper right shield 101B deployable from an upper portion of a right side of the seat back 109A, a lower left shield 101C deployable from a lower portion of the left side of the seat back 109A, and a lower right shield 101D deployable from a lower portion of the right side of the seat back 109A. Similarly, passenger seat 103B is depicted with an upper left privacy shield 101E, an upper right shield 101F, a lower left shield 101G, and a lower right shield 101H each deployable from respective portions of the seat back 109B, and passenger seat 103C is depicted with an upper left privacy shield 101J, an upper right shield 101K, a lower left shield 101L, and a lower right shield 101M each deployable from respective portions of the seat back 109C.

In some examples, respective privacy shields 101 for a passenger seat 103 may have free ends that are spaced apart, that abut, or that overlap one another. As illustrative examples, in FIG. 5, on the passenger seat 103A, adjacent privacy shields 101A through 101D are depicted as abutting one another along all facing edges, while on the passenger seat 103C, adjacent privacy shields 101J through 101M are depicted as abutting one another along most facing edges but spaced apart at facing rounded corners. As a further illustrative example, in FIG. 2, the privacy shield 101J is depicted as including or coupled with a lap-joint extension 129, e.g., which (as may be seen in FIG. 4) can fit behind the opposite privacy shield 101K so that the privacy shields 101J and 101K can be overlapping while the main free ends remain in alignment with one another. In some examples, overlapping may be accomplished by overlaying without main ends aligned, such as may be appreciated by way of example with the alternate orientation shown in phantom lines in FIG. 4 for privacy shield 101K'. Generally, overlapping arrangements may facilitate privacy shields 101 that are larger than one half of a width of the passenger seat 103. For example, in a seat 60 cm wide, a pair of equal-width, abutting, facing privacy shields 101 may extend approximately 30 cm in the extended position, while an overlapping arrangement may allow for relatively larger privacy shield 101 such as may extend a greater distance such as 35 cm or other distance.

In some examples, the privacy shield 101 is stowable in an arrangement extending laterally to overlay a portion of an adjacent passenger seat 103. An illustrative example is depicted in FIG. 4 in phantom lines relative to seat 103B, showing an alternate arrangement of privacy shield 101E' that is coupled for deploying from seat 103B but that can be stowed against or along an adjacent seat 103A, such as in a laid-flat arrangement. Such an arrangement may be particularly suitable in situations where adjacent passenger seats 103 are intentionally left empty to increase spacing among passengers and comply with protocols relating to travel during pandemic conditions, for example.

In some examples, the privacy shield 101 is releasably mounted, e.g., releasably mounted to the seat back 109. An illustrative example is depicted in FIG. 3 with respect to privacy shield 101I that may be readily added or removed relative to the seat 103B. For example, the privacy shield 101I being removable or releasably mounted may facilitate different types of privacy shields 101 being interchangeable for one another. Any suitable structure may be utilized as a suitable mount to facilitate the privacy shield being releasably mounted. Non-limiting examples may include keyway arrangements, rails, slots, zippers, or removable fasteners such as screws, bolts, clasps, latches, or similar components. In some examples, the privacy shield 101I being removable or releasably mounted may facilitate swapping out privacy shields 101 between flights, e.g., such that fresh privacy shields 101 may be provided for different passengers. In some examples, the privacy shield 101 may be releasably mounted to install the privacy shield 101 in a deployed position, and the privacy shield 101 may be released or removed in lieu of or in addition to the privacy shield 101 being capable of adjusting to another stowed position described herein.

In some examples, the privacy shield 101 may include suitable structure for sliding between deployed and stowed states. An illustrative example is depicted in FIG. 3 with respect to privacy shield 101I that is depicted with a set of sliding plates 131. The plates 131 may slide to overlap one another by varying degrees or to otherwise telescope inwardly or outwardly to move between deployed and stowed states (e.g., as depicted by double-headed arrow 133). Although the privacy shield 101I in FIG. 3 is depicted with four sliding plates 131, any suitable number may be utilized, including arrangements in which a single plate 131 is slidable to switch between deployed and stowed states or arrangements in which two, three, four, or more than four plates 131 are movable relative to one another to adjust between stowed and deployed states.

Moreover, particular features described and/or depicted herein with respect to one form of privacy shield 101, may be used with any other. Thus, for example, arrangements with overlapping relationships described relative to privacy shield 101K, arrangements with overlaying an adjacent passenger seat 103 as described relative to privacy shield 101E', or arrangements involving releasable mounting as described with respect to privacy shield 101I may individually or in combination be applicable to others.

In addition, although not depicted herein, the seat back 109 may be coupled with or include a headrest assembly. The headrest assembly may be of a fixed shape or may be adjustable to accommodate differences in preference and/or sizes of passengers. An adjustable headrest assembly may include flaps that are adjustable such as to support either side of a passenger's head. Such headrest flaps may fold along axes that are significantly offset inwardly from lateral edges of the seat back 109 and thus swing inward toward a centerline of the front 106 of the seat 103 during adjustment from an initial flat configuration, in contrast to axes along lateral edges that may facilitate swinging outward away from a centerline as with various of the privacy shields 101 described herein. The privacy shield 101 may be independent from or implemented with such a headrest assembly. For example, the headrest assembly may be mounted on the privacy shield 101 (e.g., to move when the privacy shield moves) or the privacy shield 101 may be arranged to move among positions of at least partially covering and/or exposing the headrest assembly.

In the following, further examples are described to facilitate the understanding of the invention:

As used below, any reference to a series of examples is to be understood as a reference to each of those examples disjunctively (e.g., "Examples 1-4" is to be understood as "Examples 1, 2, 3, or 4").

Example 1 is a method of enhancing privacy for a passenger of a passenger seat, the method comprising:
   deploying a shield relative to an axis along a lateral edge of the passenger seat from a stowed position in which the shield is arranged overlying a cushioning portion of a seat back of the seat or situated laterally outward from a perimeter of the seat back; and
   positioning the shield to extend forward from the lateral edge of the seat back so as to form at least a partial barrier between a living space of the passenger seat and an adjacent seat.

Example 2 is the method of example 1 (or any other preceding or subsequent example), wherein the shield comprises a first shield deployable from a first lateral side of the seat back, and wherein the method further comprises deploying a second shield from a second lateral side of the seat back.

Example 3 is the method of example 1 (or any other preceding or subsequent example), wherein the shield comprises an upper shield deployable from an upper portion of the seat back, and wherein the method further comprises deploying a lower shield from a lower portion of the seat back.

Example 4 is the method of example 1 (or any other preceding or subsequent example), wherein the shield comprises an upper left shield deployable from an upper portion of a left side of the seat back, and wherein the method further comprises:
   deploying an upper right shield from an upper portion of a right side of the seat back;
   deploying a lower left shield from a lower portion of the left side of the seat back; and
   deploying a lower right shield from a lower portion of the right side of the seat back.

Example 5 is the method of example 1 (or any other preceding or subsequent example), wherein deploying the shield comprises swinging the shield laterally about the axis along the lateral edge of the passenger seat.

Example 6 is a passenger seat (which may include features of any preceding or subsequent example) comprising:
   a seat pan;
   a seat back; and
   a privacy shield adjustable between:
      a stowed position in which the privacy shield is arranged overlying a cushioning portion of the seat back or situated laterally outward from a perimeter of the seat back; and
      a deployed position extending forward from a lateral edge of the seat back so as to form at least a partial barrier between a living space of the passenger seat and an adjacent seat.

Example 7 is the passenger seat of example 6 (or any other preceding or subsequent example), wherein the cushioning portion of the seat back remains fixed within the perimeter of the seat back in the stowed position of the privacy shield, in the deployed position of the privacy shield, and in transition between the stowed position and the deployed position of the privacy shield.

Example 8 is the passenger seat of example 6 (or any other preceding or subsequent example), wherein the privacy shield is releasably mounted to the seat back.

Example 9 is the passenger seat of example 6 (or any other preceding or subsequent example), wherein the privacy shield is stowable against the seat back.

Example 10 is the passenger seat of example 6 (or any other preceding or subsequent example), wherein the cushioning portion of the seat back is sandwiched between a rear portion of the seat back and a cushioning material in the privacy shield in the stowed position.

Example 11 is the passenger seat of example 6 (or any other preceding or subsequent example), wherein the privacy shield comprises one or more layers sized to cover a portion of a front surface of the seat back in the stowed position, wherein the one or more layers have a combined thinness through which the cushioning portion of the seat back support a passenger when seated in the seat.

Example 12 is the passenger seat of example 6 (or any other preceding or subsequent example), wherein the privacy shield is stowable in an arrangement extending laterally to overlay a portion of the adjacent seat.

Example 13 is the passenger seat of example 6 (or any other preceding or subsequent example), wherein the privacy shield comprises a first privacy shield, and wherein the passenger seat further comprises a second privacy shield coupled along an opposite lateral edge of the seat back and pivotable to position a free end of the second privacy shield to overlap the first privacy shield in the stowed position.

Example 14 is a passenger seat privacy shield (which may include features of any preceding or subsequent example) comprising:
 a partition sized to extend in a deployed position forward from a lateral edge of a seat back of a passenger seat so as to form at least a partial barrier between a living space of the passenger seat and an adjacent seat; and
 a pivot edge along which the partition is pivotable between the deployed position and a stowed position in which the partition is arranged overlying a cushioning portion of the seat back of the seat or situated laterally outward from a perimeter of the seat back.

Example 15 is the passenger seat privacy shield of example 14 (or any other preceding or subsequent example), wherein the passenger seat privacy shield is at least one of: foldable relative to a torso portion of the seat back; or foldable relative to a headrest portion of the seat back.

Example 16 is the passenger seat privacy shield of example 14 (or any other preceding or subsequent example), wherein the pivot edge comprises a hinge.

Example 17 is the passenger seat privacy shield of example 16 (or any other preceding or subsequent example), wherein the hinge comprises a fabric juncture.

Example 18 is the passenger seat privacy shield of example 17 (or any other preceding or subsequent example), wherein the fabric juncture comprises a knitted structure.

Example 19 is the passenger seat privacy shield of example 14 (or any other preceding or subsequent example), wherein the partition comprises cushioning material.

Example 20 is the passenger seat privacy shield of example 14 (or any other preceding example), wherein the partition comprises a collapsible partition collapsible along at least one axis to fit within a space between the lateral edge of the seat back of the passenger seat and the adjacent seat.

Different arrangements of the components depicted in the drawings or described above, as well as components and steps or actions not shown or described are possible. Similarly, some features and sub-combinations are useful and may be employed without reference to other features and sub-combinations. Embodiments of the invention have been described for illustrative and not restrictive purposes, and alternative embodiments will become apparent to readers of this patent. Accordingly, the present invention is not limited to the embodiments described above or depicted in the drawings, and various embodiments and modifications may be made without departing from the scope of the claims below.

That which is claimed is:

1. A method of enhancing privacy for a passenger of a passenger seat, the method comprising:
 deploying at least one of an upper shield and a lower shield relative to an axis along a lateral edge of the passenger seat from a stowed position in which the at least one of the upper shield and the lower shield is arranged overlying a cushioning portion of a seat back of the seat or situated laterally outward from a perimeter of the seat back, wherein the lateral edge comprises a pivot edge, wherein a hinge connects the at least one of the upper shield and the lower shield with the pivot edge, wherein the hinge comprises a fabric juncture connecting the at least one of the upper shield and the lower shield with the pivot edge, wherein a knitted structure forms at least a portion of the fabric juncture, and wherein each of the upper shield and the lower shield comprises a plurality of slidably connected plates; and
 positioning the at least one of the upper shield and the lower shield to extend forward from the lateral edge of the seat back so as to form at least a partial barrier between a living space of the passenger seat and an adjacent seat.

2. The method of claim 1, wherein the lateral edge comprises a first lateral edge, and the method further comprises deploying at least one of a second upper shield and a second lower shield from a second lateral edge of the seat back, the second lateral edge opposing the first lateral edge.

3. The method of claim 1, wherein deploying the at least one of the upper shield and the lower shield comprises deploying both the upper shield and the lower shield.

4. The method of claim 1, wherein the lateral edge comprises a first lateral edge, deploying the at least one of the upper shield and the lower shield comprises deploying both the upper shield and the lower shield, and the method further comprises deploying both a second upper shield and a second lower shield from a second lateral edge of the seat back, the second lateral edge opposing the first lateral edge.

5. The method of claim 1, wherein deploying the at least one of the upper shield and the lower shield comprises swinging the at least one of the upper shield and the lower shield laterally about the axis along the lateral edge of the passenger seat.

6. A passenger seat comprising:
 a seat pan;
 a seat back comprising a lateral edge, the lateral edge comprising a pivot edge;
 a privacy shield comprising an upper privacy shield and a lower privacy shield, the upper privacy shield and the lower privacy shield each comprising a plurality of slidably connected plates; and
 a hinge connecting the privacy shield with the pivot edge, wherein the hinge comprises a fabric juncture connecting the privacy shield with the pivot edge, and wherein a knitted structure forms at least a portion of the fabric juncture;

wherein the each of the upper privacy shield and the lower privacy shield are adjustable between:
- a stowed position in which a respective privacy shield is arranged overlying a cushioning portion of the seat back or situated laterally outward from a perimeter of the seat back; and
- a deployed position extending forward from a lateral edge of the seat back so as to form at least a partial barrier between a living space of the passenger seat and an adjacent seat, the respective privacy shield movable between the stowed position and the deployed position at least partially by pivoting about the pivot edge.

7. The passenger seat of claim 6, wherein the cushioning portion of the seat back remains fixed within the perimeter of the seat back in the stowed position of each of the upper privacy shield and the lower privacy shield, in the deployed position of each of the upper privacy shield and the lower privacy shield, and in transition between the stowed position and the deployed position of each of the upper privacy shield and the lower privacy shield.

8. The passenger seat of claim 6, wherein at least one of the upper privacy shield and the lower privacy shield is releasably mounted to the seat back.

9. The passenger seat of claim 6, wherein each of the upper privacy shield and the lower privacy shield is stowable against the seat back.

10. The passenger seat of claim 6, wherein the cushioning portion of the seat back is sandwiched between a rear portion of the seat back and a cushioning material in at least one of the upper privacy shield and the lower privacy shield in the stowed position.

11. The passenger seat of claim 6, wherein at least one of the upper privacy shield and the lower privacy shield comprises one or more layers sized to cover a portion of a front surface of the seat back in the stowed position, wherein the one or more layers have a combined thinness through which the cushioning portion of the seat back are configured to support a passenger when seated in the seat.

12. The passenger seat of claim 6, wherein at least one of the upper privacy shield and the lower privacy shield is stowable in an arrangement extending laterally to overlay a portion of the adjacent seat.

13. The passenger seat of claim 6, wherein the privacy shield comprises a first privacy shield, and wherein the passenger seat further comprises a second privacy shield coupled along an opposite lateral edge of the seat back and pivotable to position a free end of the second privacy shield to overlap the first privacy shield in the stowed position.

14. A passenger seat privacy shield comprising:
- an upper partition and a lower partition, each sized to extend in a deployed position forward from a lateral edge of a seat back of a passenger seat so as to form at least a partial barrier between a living space of the passenger seat and an adjacent seat, each of the upper partition and the lower partition comprising a plurality of slidably connected plates;
- a pivot edge along which the upper partition and the lower partition are pivotable between the deployed position and a stowed position in which a respective partition is arranged overlying a cushioning portion of the seat back of the seat or situated laterally outward from a perimeter of the seat back; and
- a hinge connecting the upper partition and the lower partition with the pivot edge, wherein the hinge comprises a fabric juncture connecting the upper partition and the lower partition with the pivot edge, and wherein a knitted structure forms at least a portion of the fabric juncture.

15. The passenger seat privacy shield of claim 14, wherein the passenger seat privacy shield is at least one of:
- deployable relative to a torso portion of the seat back; or
- deployable relative to a headrest portion of the seat back.

16. The passenger seat privacy shield of claim 14, wherein at least one of the upper partition and the lower partition comprises cushioning material.

17. The passenger seat privacy shield of claim 14, wherein at least one of the upper partition and the lower partition is collapsable to fit within a space between the lateral edge of the seat back of the passenger seat and the adjacent seat.

* * * * *